Oct. 31, 1967 W. H. NEBGEN 3,349,571
REMOVAL OF CARBON DIOXIDE FROM SYNTHESIS GAS USING
SEPARATED PRODUCTS TO COOL EXTERNAL
REFRIGERATION CYCLE
Filed Jan. 14, 1966
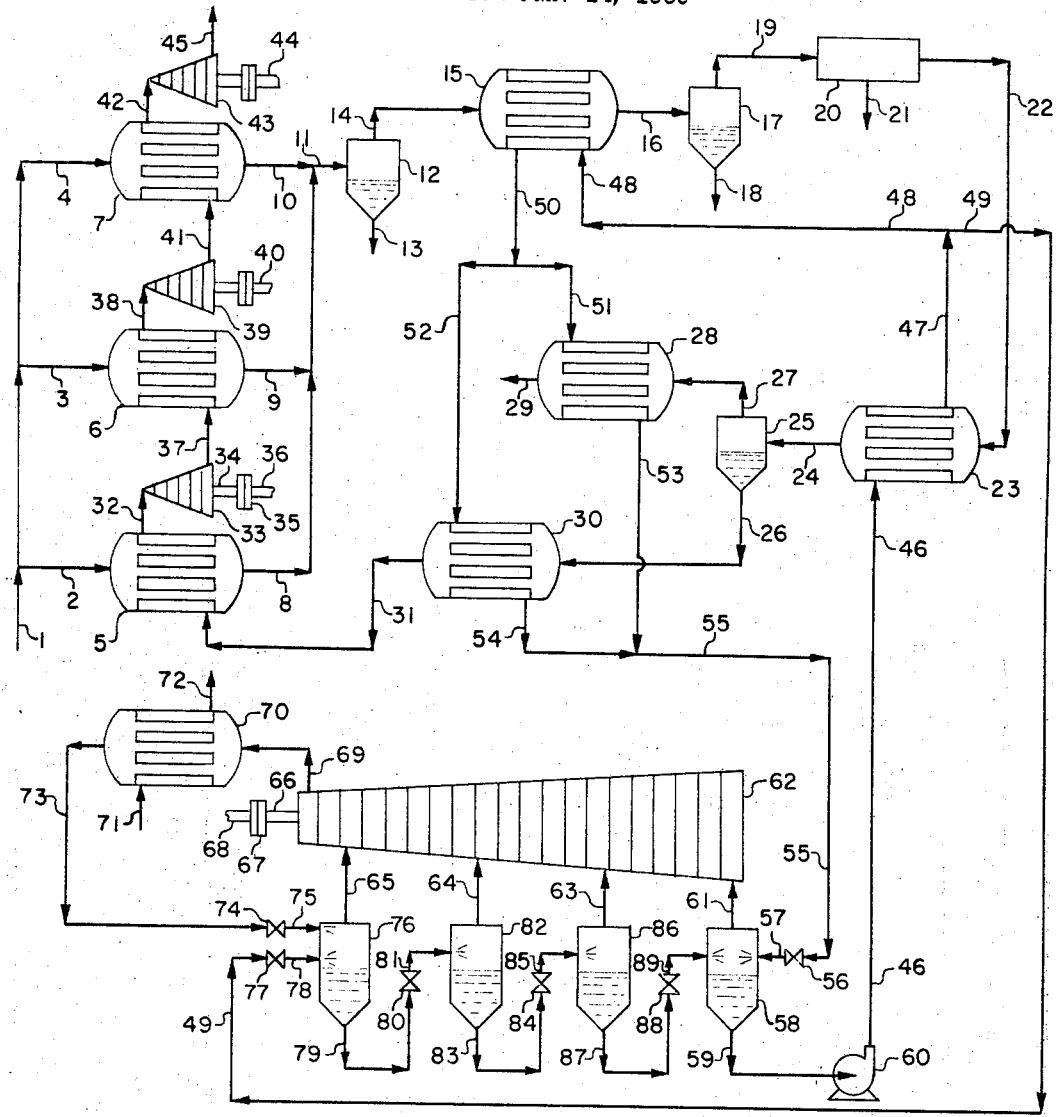
WILLIAM H. NEBGEN
INVENTOR.
BY J. T. Chaboty
AGENT United States Patent Office 3,349,571
Patented Oct. 31, 1967

3,349,571
REMOVAL OF CARBON DIOXIDE FROM SYNTHE-
SIS GAS USING SEPARATED PRODUCTS TO
COOL EXTERNAL REFRIGERATION CYCLE
William H. Nebgen, Woodside, N.Y., assignor to Chemical Construction Corporation, New York, N.Y., a corporation of Delaware
Filed Jan. 14, 1966, Ser. No. 520,795
13 Claims. (Cl. 62—23)

The present invention relates to the removal of a condensable gas component from a mixed gas stream by selective condensation at reduced temperature, through the utilization of a sub-cooled liquid refrigerant under pressure as the heat removal medium. The invention provides a new and highly efficient method for the removal of carbon dioxide from high pressure synthesis gas, such as the hydrogen-containing synthesis gas produced for the synthesis of ammonia, methanol or liquid hydrocarbons.

The production of synthesis gas is commercially attained either by the partial oxidation or the catalytic stream reforming of fluid hydrocarbons. In the partial oxidation process, the fluid hydrocarbon is reacted with gaseous oxygen at a highly elevated temperature, to produce a crude synthesis gas principally containing hydrogen, carbon monoxide and carbon dioxide. The crude synthesis gas is cooled, and is then usually subjected to the water gas shift reaction, in which carbon monoxide is catalytically reacted with steam to produce additional hydrogen and carbon dioxide. In the catalytic steam reforming process, the fluid hydrocarbon is reacted with steam at elevated temperature and in the presence of a suitable catalyst, such as nickel or cobalt. The reaction takes place in externally heated catalyst-filled tubes, and the resulting gas stream which usually contains some unreacted hydrocarbon is subjected to further catalytic reaction after the addition of an oxygen-containing gas such as air, to provide further temperature elevation. The resulting crude synthesis gas thus produced contains components similar to the components present in the synthesis gas produced by partial oxidation, and is subjected to cooling and the water gas shift reaction as described supra.

The final synthesis gas derived from either the partial oxidation process or from catalytic steam reforming thus principally contains hydrogen and carbon dioxide, together with a residual proportion of carbon monoxide which may be of significant proportions in some cases, as when the synthesis gas is to be employed in catalytic methanol or Fischer-Tropsch synthesis. In any case, it is usually necessary to remove a major portion or all of the carbon dioxide content from the synthesis gas. Carbon dioxide removal has been carried out in the prior art by scrubbing the gas stream with a selective liquid solvent for the carbon dioxide, such as aqueous sodium or potassium carbonate or monoethanolamine solution. The solvent solution containing dissolved carbon dioxide is then regenerated by heating the solution, usually at reduced pressure, to evolve gaseous carbon dioxide. These solvents are costly and corrosive, and consequently expensive materials of construction must be provided. In addition, substantial amounts of steam or other heating fluid must be provided to regenerate the solvent solution. Carbon dioxide removal has also been accomplished by scrubbing the gas stream at elevated pressure with water, thereby dissolving a proportion of the carbon dioxide into the liquid water phase. The dissolved carbon dioxide is removed from the water by pressure reduction, usually followed by passing the water through an atmospheric cooling tower prior to recycle. This procedure requires the circulation of large quantities of water with attendant power consumption, and is also objectionable because only partial carbon dioxide removal is attained and the gas stream is cooled with resultant waste of usable sensible heat, and also because the final gas stream is saturated with water vapor. Finally, it has been proposed to cool the gas stream at elevated pressure to a low temperature, in order to attain selective condensation of liquid carbon dioxide, which is then separated from the residual gas stream. One procedure of this nature, as described in U.S. Patent No. 2,632,316, entails the provision of a cooling effect for cooling the gas stream by passing the gas stream in heat exchange with previously liquefied carbon dioxide, which is thereby vaporized, and also in heat exchange with separated and expanded carbon dioxide gas, which also provides a cooling effect due to expansion. The gas stream is also cooled by passing in heat exchange with the cold product gas stream. This procedure involves an elaborate and complex heat exchanger, and the provision of auxiliary facilities for the preliminary removal of water vapor from the gas stream.

In the present invention, an improved and highly efficient procedure is provided for the separation of a condensable gas component from a mixed gas stream, by cooling the gas stream using a sub-cooled and pressurized liquid refrigerant. The procedure provides a new and efficient method for the removal of carbon dioxide from a hydrogen-containing synthesis gas stream, with novel sequences for the recovery of power and efficient conservation of the cooling capacity of the refrigerant. The crude synthesis gas at elevated pressure and containing carbon dioxide and water vapor is first cooled by heat exchange with previously separated carbon dioxide, which is also at elevated pressure. The carbon dioxide is thus superheated and is then expanded through power generating means such as a gas turbine, with the production of useful power. The cooling of the crude synthesis gas results in the condensation of water vapor from the gas stream, which is separated as liquid water. The gas stream is further cooled by heat exchange with a sub-cooled pressurized liquid refrigerant, to condense further water vapor. After removal of liquid water, the gas stream is treated in a conventional manner to remove residual water vapor.

The resultant synthesis gas stream, still containing carbon dioxide but free of water vapor, is now processed in accordance with the invention, in order to condense carbon dioxide from the gas stream as a liquid condensate. The gas stream, still at elevated pressure, is further cooled by heat exchange with a sub-cooled and pressurized liquid refrigerant, to a temperature below $-10°$ C. A major portion of the carbon dioxide is thus condensed to liquid, and is separated from the cold residual synthesis gas stream. Warmed liquid refrigerant is divided into two portions, with one portion being cooled by heat exchange with the cold residual synthesis gas stream and the other portion being cooled by heat exchange with the liquid carbon dioxide. The cooled liquid refrigerant portions are combined, and the combined liquid refrigerant stream is adiabatically expanded to a reduced pressure, with a concomitant cooling effect and the formation of a refrigerant vapor phase and a residual liquid refrigerant phase at a further reduced temperature. The liquid refrigerant phase is pressurized and is thus sub-cooled, and is then recycled for further heat exchange, while the vaporized refrigerant phase is compressed in mechanical compression means and cooled to form condensed liquid refrigerant. The condensed liquid refrigerant is then adiabatically expanded to reduced pressure, preferably in a plurality of stages at successively reduced pressure, and the evolved vapor portion is compressed and recycled, while the residual liquid portion is combined with the residual liquid refrigerant phase derived from adiabatic expansion of the cooled principal liquid refrigerant stream.

The principal advantage of the method of the present invention is that a condensable gas component in a mixed gas stream, such as carbon dioxide, is condensed and separated from the gas stream in a more efficient and economical manner, due to the use of a sub-cooled liquid refrigerant as the cooling agent. Greater efficiency is attained due to the cooling of the warmed liquid refrigerant by adiabatic or flash expansion to a reduced pressure level, followed by separate recompression of the vapor and residual liquid phases. In addition, a substantial amount of power is recovered by expansion of the separated carbon dioxide through power producing means such as an expansion turbine, and the power thus produced is in excess of the power requirement for recompression of the refrigerant vapor. Thus, the system attains carbon dioxide separation without net power consumption in most cases, and the excess power may be utilized elsewhere in the facility.

It is an object of the present invention to separate a condensable gas component from a mixed gas stream in an improved manner.

Another object is to separate carbon dioxide from hydrogen-containing synthesis gas by improved selective condensation.

An additional object is to utilize a sub-cooled liquid refrigerant in an improved manner to provide a cooling effect for selective condensation of a condensable gas component from a mixed gas stream.

A further object is to provide an improved method for selective condensation of a condensable gas component from a mixed gas stream employing a circulating sub-cooled liquid refrigerant which is warmed during condensation and thereafter cooled by heat exchange with product streams and adiabatic flash expansion.

Still another object is to recover useful power from separated high pressure liquid carbon dioxide condensate in an improved manner, after selective condensation and separation of liquid carbon dioxide from a hydrogen-containing synthesis gas stream.

These and other objects and advantages of the present invention will become evident from the description which follows. Referring to the figure, which is a flowsheet of a preferred embodiment of the present invention, stream 1 is a hydrogen-containing synthesis gas stream which also contains a substantial proportion of carbon dioxide, usually in the range of from about 10% to 40% by volume. Stream 1 usually contains a minor proportion of up to about 10% by volume of water vapor, and will generally be derived from a partial oxidation or catalytic steam reforming process as described supra, at a temperature typically in the range of 100° C. to 200° C. Stream 1 is also at an elevated pressure, typically in the range of 80 to 140 kg./sq. cm. In instances where the process synthesis gas stream is produced at low or atmospheric pressure, the gas stream will be compressed by means not shown, to produce stream 1. In other instances, the partial oxidation or catalytic steam reforming processes may be operated at elevated pressure, in which case stream 1 is derived directly from these processes without intermediate pressure elevation.

Stream 1 is preferably divided into a plurality of portions, such as streams 2, 3 and 4, which are passed into individual heat exchange units 5, 6 and 7 respectively, and are cooled to a lower temperature, usually with concomitant condensation of a portion of the water vapor content of the streams to liquid water. The heat derived from the cooling of streams 2, 3 and 4 is recovered as useful power in a manner to be described infra. The resulting cooled streams 8, 9 and 10 discharged from units 5, 6 and 7 respectively are typically at a temperature in the range of 25° C. to 75° C., and are re-combined to form stream 11, which is passed into gas-liquid separator unit 12 in order to remove condensed liquid water from the gas stream. Unit 12 is a conventional cyclonic or baffled device for the separation of entrained liquid from a gas stream. The separated liquid water is discharged from unit 12 via stream 13.

The residual synthesis gas stream 14 withdrawn from unit 12 is passed into heat exchanger 15, and is cooled to a lower temperature with concomitant further condensation of water vapor to liquid water. The resulting cooled process stream 16, now at a reduced temperature typically in the range of 10° C. to 30° C. and containing condensed liquid water, is passed into separator unit 17, which is similar in configuration and function to unit 12 described supra. Separated liquid water is discharged from unit 17 via stream 18, and the residual synthesis gas stream 19 derived from unit 17 now contains only a minor proportion of residual water vapor. Stream 19 is now treated for complete removal of residual water vapor in drier unit 20, which may contain a solid desiccant such as alumina, silica gel or a molecular sieve composition. Unit 20 may alternatively consist of a scrubbing tower in which the gas stream is scrubbed with a liquid desiccant such as concentrated sulfuric acid. Other alternative means known to the art for complete removal of water vapor from a gas stream may be employed in unit 20. In any case, the residual water vapor component or the desiccant containing absorbed water vapor is discharged from unit 20 via stream 21. The cold and completely dry synthesis gas stream is now discharged from unit 20 as stream 22.

Stream 22 is now subjected to selective condensation of liquid carbon dioxide in accordance with the present invention. Thus, stream 22 is passed into heat exchanger unit 23, and is cooled in countercurrent heat exchange with a sub-cooled pressurized liquid refrigerant as will be described infra. The resulting further cooled synthesis gas stream 24 is now at a temperature below −10° C., and is preferably at a temperature in the range of −25° C. to −40° C. Stream 24 contains condensed liquid carbon dioxide, and thus stream 24 will not be cooled to a temperature below −60° C., which is the solidification temperature of solid carbon dioxide, in order to avoid the formation of solid carbon dioxide in the gas stream. Stream 24 is now passed into gas-liquid separator 25, which is a unit similar in configuration and function to unit 12 described supra, except that liquid carbon dioxide is separated from the residual gas stream rather than liquid water. The separated liquid carbon dioxide is withdrawn from unit 25 as stream 26, and the cold residual synthesis gas stream 27 withdrawn from unit 25 is of substantially reduced carbon dioxide content. Stream 27 is now passed into heat exchanger 28 and is heated in countercurrent heat exchange with recycling liquid refrigerant, in order to cool the refrigerant prior to recycle of refrigerant in accordance with the invention. The warmed product synthesis gas stream 29 discharged from unit 28, now at a temperature typically in the range of 10° C. to 70° C. and of substantially reduced carbon dioxide content, is passed to further chemical processing and utilization, not shown.

Returning to unit 25, the liquid carbon dioxide stream 26 is passed into heat exchanger 30, and is heated in unit 30 in heat exchange with recycling liquid refrigerant, in order to cool the refrigerant prior to recycle of refrigerant in accordance with the invention. The resulting carbon dioxide stream 31 discharged from unit 30, now at a temperature typically in the range of 10° C. to 70° C. and at a highly elevated and preferably supercritical pressure comparable to the pressure of stream 1, is now utilized as a power generation medium in accordance with the present invention. Thus, stream 31 is passed into heat exchanger 5, and is superheated in heat exchange with stream 2. The resulting superheated supercritical carbon dioxide stream 32 discharged from unit 5, now at a temperature typically in the range of 60° C. to 180° C. and an elevated pressure typically in the range of 80 to 140 kg./sq. cm., is now expanded through mechanical power generating means 33, which will usually consist of an expansion turbine, with resultant generation of useful power. The shaft 34 of turbine 33 is connected by coupling 35 to the shaft 36 of a power consuming device, such as a compressor, pump or electrical generator.

The expanded gaseous carbon dioxide stream 37 discharged from unit 33, now at a lower superatmospheric pressure typically in the range of 14 to 40 kg./sq. cm. and a reduced temperature typically in the range of 10° C. to 70° C., is now passed into heat exchanger 6 prior to further utilization as a power generation medium. The gaseous carbon dioxide stream 37 is thus superheated in unit 6 while in heat exchange with stream 3. The resulting superheated gaseous carbon dioxide stream 38 discharged from unit 6 is at a temperature typically in the range of 60° C. to 180° C., and is expanded to a lower superatmospheric pressure through mechanical power generating means 39, which is similar in configuration and function to unit 33 described supra and serves to drive shaft 40 which is connected to a power consuming device.

The further expanded gaseous carbon dioxide stream 41 discharged from unit 39, now at a lower superatmospheric pressure typically in the range of 2.5 to 10 kg./sq. cm. and a reduced temperature typically in the range of 10° C. to 70° C., is now passed into heat exchanger 7 prior to final utilization as a power generation medium. The gaseous carbon dioxide stream 41 is thus superheated in unit 7 while in heat exchange with stream 4. The resulting superheated gaseous carbon dioxide stream 42 discharged from unit 7 is at a temperature typically in the range of 60° C. to 180° C., and is expanded to atmospheric pressure through mechanical power generating means 43, which is similar in configuration and function to unit 33 described supra and serves to drive shaft 44 which is connected to a power consuming device. The fully expanded gaseous carbon dioxide stream 45 is discharged from unit 43 to atmosphere. Stream 45 may alternatively be employed in auxiliary chemical processing or synthesis, not shown.

Returning now to unit 23, stream 22 is cooled by heat exchange with sub-cooled pressurized liquid refrigerant stream 46. Stream 46 may consist of any suitable liquid refrigerant, however one or a mixture of several Freon compositions is preferred. Among the suitable Freon refrigerants usable in the present invention are Freon 11, also known as R-11 and consisting of trichlormonofluormethane; Freon 12, also known as R-12 and consisting of dichlordifluormethane; Freon 22, also known as R-22 and consisting of monochlordifluormethane; and Freon 21, also known as R-21 and consisting of dichlorfluormethane. Other suitable refrigerants usable in the present invention as stream 46 consist of ammonia, propane or butane. The liquid refrigerant stream 46 is sub-cooled, that is, stream 46 is at a pressure above the pressure at which a vapor phase can exist at the specific temperature of stream 46, and the liquid refrigerant stream remains at elevated pressure and in the sub-cooled condition throughout the heat exchange procedure without the formation of a vapor phase, except during adiabatic pressure reduction which is part of the recycle procedure as will appear infra. Thus, the refrigerant remains in the liquid state throughout the heat exchange sequences of the present invention, and heat absorption or release is solely as sensible heat of the liquid refrigerant. The procedure of the present invention consequently differs substantially from the conventional refrigeration cycle, in which a liquid refrigerant is vaporized to attain a cooling effect, while in heat exchange with a fluid which is consequently cooled or refrigerated.

Stream 46 is admitted into heat exchanger unit 23 at an extremely low temperature, typically in the range of −20° C. to −60° C., and an elevated pressure typically in the range of 10 kg./sq. cm. to 30 kg./sq. cm., and serves to cool stream 22 as described supra. The liquid refrigerant is warmed in unit 23, and the resultant liquid refrigerant stream 47 discharged from unit 23 is typically at a temperature in the range of −10° C. to 40° C. Stream 47 is now divided into streams 48 and 49. Stream 49 is recycled as will be described infra, while stream 48 is admitted into heat exchanger unit 15 and is further warmed, thus serving to cool stream 14 as described supra. The resultant liquid refrigerant stream 50 discharged from unit 15 is typically at a temperature in the range of 20° C. to 60° C., and due to the elevated pressure of the liquid refrigerant, stream 50 does not contain a vapor phase and is entirely liquid.

Stream 50 is now divided into streams 51 and 52, which are now cooled and recycled. Thus, stream 51 is admitted into heat exchanger 28 and is cooled by the process gas, thus serving to warm stream 27 as described supra. The resultant cooled liquid refrigerant stream 53 discharged from unit 28 is typically at a temperature in the range of 0° C. to −50° C. Stream 52 is admitted into heat exchanger 30 and is cooled by the carbon dioxide, thus serving to warm stream 26 as described supra. The resultant cooled liquid refrigerant stream 54 discharged from unit 30 is typically at a temperature in the range of 0° C. to −50° C. Cooled liquid refrigerant streams 53 and 54 are now combined to form stream 55, which is now recycled in accordance with the present invention for further cooling of synthesis gas.

Stream 55 is now subjected to adiabatic or flash expansion to a lower pressure level, with concomitant vapor evolution. Due to the adiabatic vapor evolution at reduced pressure, a cooling effect is obtained and the resultant vapor and residual liquid phases are produced at a reduced temperature level. Thus stream 55 is passed through expansion valve 56, and the resultant stream 57, now at a reduced pressure typically in the range of 0.3 to 1.4 kg./sq. cm. is discharged into vapor-liquid separator 58, which is a unit similar in configuration and function to unit 12 described supra. In some instances unit 58 may simply consist of an open cylindrical vessel. The resulting separated and cooled liquid phase in unit 58, now at a reduced temperature typically in the range of −20° C. to −60° C., is withdrawn from unit 58 via stream 59, pressurized in pump 60, and recycled as sub-cooled pressurized liquid refrigerant stream 46 described supra.

Returning to separator 58, the evolved refrigerant vapor phase is withdrawn as stream 61 and passed into the lowest pressure stage of multi-stage compressor 62. Stream 61 is compressed to successively higher pressure in unit 62, together with additional refrigerant vapor portions 63, 64 and 65 which are derived in a manner to be described infra. Vapor portions 63, 64 and 65 are produced at successively higher pressure levels compared to stream 61, and thus are successively passed to compressor 62 during later stages of compression at higher pressure levels. Compressor 62 is driven by shaft 66, which is connected by coupling 67 to the shaft 68 of a power source such as an electric motor, not shown. The resultant fully compressed refrigerant vapor stream 69 discharged from unit 62 is typically at a pressure in the range of 10 to 30 kg./sq. cm. and a temperature in the range of 70° C. to 150° C. Stream 69 is cooled and condensed in heat exchanger 70 by heat exchange with a suitable fluid such as cooling water, which is admitted to unit 70 via stream 71 and discharged as warmed cooling water via stream 72. The resultant condensed liquid refrigerant stream 73 discharged from unit 70 is at a reduced temperature typically in the range of 20° C. to 70° C.

Stream 73 is now adibatically expanded to reduced pressure together with stream 49, in order to produce a refrigerant vapor portion and a residual refrigerant liquid portion at substantially reduced temperature which is suitable for inclusion as a component of stream 59. The adiabatic expansion of streams 73 and 49 to reduced pressure preferably takes place in a plurality of stages, in order to conserve energy and relative pressure levels of the vapor portions. Thus, stream 73 is passed through adiabatic or flash expansion valve 74, and the resultant stream 75 at a partially reduced pressure is passed into unit 76, which is similar in configuration and function to unit 58 described supra. Similarly, stream 49 is passed through adiabatic or flash expansion valve 77, and the resultant stream 78 at a partially reduced pressure is also passed into unit 76, together with stream 75. A refrigerant vapor component is withdrawn from unit 76 as stream 65, while the residual liquid refrigerant, now at a partially reduced temperature, is withdrawn from unit 76 as stream 79, which is passed through adiabatic or flash expansion valve 80. The resultant stream 81 at a further reduced pressure is passed into unit 82, which is similar to unit 58 described supra. A refrigerant vapor component is withdrawn from unit 82 as stream 64, while the residual liquid refrigerant, now at a further reduced temperature, is withdrawn from unit 82 as stream 83, which is passed through adiabatic or flash expansion valve 84. The resultant stream 85 at a further reduced pressure is passed into unit 86, which is similar to unit 58 described supra. A refrigerant vapor component is withdrawn from unit 86 as stream 63, while the residual liquid refrigerant, now at a further reduced temperature, is withdrawn from unit 86 as stream 87, which is passed through adiabatic or flash expansion valve 88. The resultant stream 89 at a final reduced pressure typically in the range of 0.3 to 1.4 kg./sq. cm. is passed into unit 58. The refrigerant vapor component of stream 89 passes from unit 58 in stream 61, while the liquid refrigerant component of stream 89 passes from unit 58 in stream 59.

Numerous alternatives within the scope of the present invention will occur to those skilled in the art. Thus, the ranges of process variables such as pressure and temperature mentioned supra constitute merely preferable ranges of these operating variables for optimum utilization of the concepts of the present invention, and the invention may also be practiced in suitable instances under operating conditions other than those enumerated supra, except that stream 24 will generally be produced at a temperature below −10° C., in order to attain substantial condensation of liquid carbon dioxide.

Other alternatives and modifications of the invention may be mentioned. Heat exchange units 6 and 7 and turbines 39 and 43 may be omitted, in which case all of stream 1 will pass via stream 2 into unit 5, and the resultant stream 8 will consist of the total cooled synthesis gas stream passed via 11 into unit 12. In this case, stream 37 will be at substantially lower or atmospheric pressure, and the total power recovery will take place via unit 33. Similarly, only units 7 and 43 may be omitted, with total power recovery taking place via units 33 and 39. Stream 31 may be divided into 3 portions, each of which will then be separately superheated in one of the units 5, 6 and 7. In this case, streams 37 and 41 will be expanded to substantially atmospheric pressure and discharged to atmosphere. It will be evident to those skilled in the art that the power recovery sequence shown in the figure provides optimum power recovery and efficiency in most instances. Shafts 36, 40 or 44 may be directly connected with or coupled to shaft 68, in which case turbines 33, 39 or 43 or any combination of these units will serve to drive the compressor 62.

The invention is generally applicable to the selective condensation of a suitable gas component from any suitable gas mixture. Thus, in some instances the feed gas mixture will be free of water vapor or similar components, and may be admitted directly to the refrigeration and selective condensation unit 23 as stream 22. In other instances, the feed gas mixture may be admitted to the procedure via stream 14, in which case units 17 and 20 may be omitted if the feed gas mixture is free of water vapor or similar components. One basic aspect of the invention entails the refrigeration, selective condensation, and recycle sequence embodiment in units 23, 25, 28, 30, 60 and 62 with their appurtenances. Thus, in some instances stream 31 may be discharged to atmosphere or passed directly to further processing not shown, such as urea synthesis. Another alternative within this basic aspect of the invention entails passing the feed gas mixture to the procedure as stream 22, and omitting units 15, 17 and 20, with stream 48 being divided into two portions to form streams 51 and 52. Another alternative entails the omission of stream 49, in which case stream 48 would consist of the entire stream 47. Stream 49 may also be partially or totally recycled as a component of streams 51 or 52. Stream 73 may be partially recycled as a component of streams 51 or 52, or a portion of stream 50 may be recycled by being adiabatically expanded into vessel 76 together with streams 73 and 49. The sequence of successive adiabatic or flash expansions of liquid refrigerant streams 73 and 49 in a plurality of stages followed by separation of vaporized refrigerant phases, as in units 76, 82 and 86, constitutes a preferred embodiment of the invention for maximum thermodynamic efficiency and conservation of pressure levels of vaporized refrigerant. Stream 55 may also be adiabatically expanded to reduced pressure in a plurality of stages, as was done with streams 73 and 49. It will also be apparent that all or some of units 76, 82 and 86 may be omitted in suitable instances, and that streams 73 or 49 or both may be directly adiabatically expanded into vessel 58. This latter alternative is relatively less desirable, due to basic thermodynamic considerations such as conservation of pressure levels of refrigerant vapor streams 63, 64 and 65. Finally, it will be apparent that in practice stream 26 may contain minor dissolved equilibrium proportions of some or all of the components present in stream 27.

An example of industrial application of the invention will now be described. In the example infra, separate data tables are presented for the process fluid and refrigerant streams. The refrigerant employed in the example is Freon 22, described supra.

*Example*

The procedure of the invention was applied to the removal of carbon dioxide from a hydrogen-containing synthesis gas stream, which was produced at a temperature of 140° C. and pressure of 105 kg./sq. cm., and at a total input flow of 8563 mols/hour, by partial oxidation of a hydrocarbon feed stream at elevated pressure, followed by cooling in a waste heat boiler and catalytic reaction of the carbon monoxide content of the gas stream with water vapor to produce further hydrogen. Following is data relative to major process streams in the sequence of the invention.

TABLE I.—PROCESS STREAMS

| Stream No. | Stream Composition, mols per hour | | | | | | Stream Temp., °C. | Stream Pressure, kg./sq. cm. |
|---|---|---|---|---|---|---|---|---|
| | Total | Hydrogen | Carbon Monoxide | Carbon Dioxide | Nitrogen | Water | | |
| 1 | 8,563 | 5,400 | 206 | 2,557 | 107 | 293 | 140 | 105 |
| 8 | 5,110 | | | | | | 43 | 105 |
| 9 | 1,848 | | | | | | 44 | 105 |
| 10 | 1,610 | | | | | | 44 | 105 |
| 11 | 8,563 | 5,400 | 206 | 2,557 | 107 | 293 | 44 | 105 |
| 14 | 8,272 | 5,400 | 206 | 2,551 | 107 | 8 | 44 | 105 |
| 19 | 8,266 | 5,400 | 206 | 2,551 | 107 | 2 | 18 | 105 |
| 22 | 8,264 | 5,400 | 206 | 2,551 | 107 | | 18 | 105 |
| 27 | 6,364 | 5,400 | 206 | 651 | 107 | | −40 | 105 |
| 29 | 6,364 | 5,400 | 206 | 651 | 107 | | 30 | 105 |
| 26 | 1,900 | | | 1,900 | | | −40 | 105 |
| 31 | 1,900 | | | 1,900 | | | 30 | 105 |
| 32 | 1,900 | | | 1,900 | | | 132 | 105 |
| 37 | 1,900 | | | 1,900 | | | 35 | 24.6 |
| 38 | 1,900 | | | 1,900 | | | 132 | 24.6 |
| 41 | 1,900 | | | 1,900 | | | 37 | 4.57 |
| 42 | 1,900 | | | 1,900 | | | 132 | 4.57 |
| 45 | 1,900 | | | 1,900 | | | 49 | 1.05 |

Units 33, 39 and 43 consisted of turbines which generated, respectively, 890, 1140 and 1090 horsepower from expansion of superheated carbon dioxide.

Following is data relative to the major refrigerant streams utilized in the example. As will appear infra, a portion of stream 73 was combined and recycled with stream 52.

TABLE II.—REFRIGERANT STREAMS (FREON 22)

| Stream No. | Flow Rate, kg./hour | Temp., °C. | Pressure, kg./sq. cm. |
|---|---|---|---|
| 46 | 263,000 | −48 | 15.9 |
| 48 | 103,000 | 10 | 15.9 |
| 50 | 103,000 | 36 | 15.9 |
| 53 | 73,500 | −35 | 15.9 |
| 52 a | 68,000 | 36 | 15.9 |
| 55 | 141,500 | −35 | 15.9 |
| 59 | 263,000 | −48 | 0.822 |
| 61 | 16,600 | −48 | 0.822 |
| 63 | 13,700 | −30 | 1.71 |
| 64 | 22,300 | −10 | 3.49 |
| 65 | 5,450 | 10 | 7.21 |
| 69 | 58,050 | 90 | 14.95 |
| 73 b | 19,550 | 36 | 14.95 | a Includes 38,500 kg./hr. recycled from stream 73.
b Net flow to unit 76.

The total power requirement for refrigerant vapor compressor unit 62 was 1620 horsepower. Thus, the power recovered in unit 33, 39 and 43 was in excess of the power requirement for operation of unit 62, and the procedure of the invention resulted in a net export of usable power.

In the example supra, the minor loss of fluid head or pressure due to fluid friction in flowing through the process units and piping was of negligible proportion and was not measured or reported.

It was established that the cooling of stream 22 to a lower final temperature such as −55° C. in unit 23, which is below the temperature of −40° C. obtained for streams 26 and 27 in the example supra, would result in the condensation and separation of a greater proportion of liquid carbon dioxide via stream 26, so that stream 27 would contain less residual carbon dioxide. However, this alternative would require greater refrigeration capacity, and greater consumption of power for operation of compressor 62, and it was determined that the net excess power produced for export with this alternative modification is reduced by 995 horsepower.

I claim:

1. A method for the removal of a condensable gaseous component from a mixed gas stream by selective condensation at reduced temperature which comprises cooling said mixed gas stream to a reduced temperature by heat exchange with a sub-cooled pressurized liquid refrigerant stream, whereby said condensable gaseous component is at least partially condensed to liquid condensate, separating said liquid condensate from the cold residual gas stream, dividing the warmed liquid refrigerant stream derived from said heat exchange into a first refrigerant portion and a second refrigerant portion, cooling said first refrigerant portion by heat exchange with said liquid condensate, whereby said liquid condensate is warmed, cooling said second refrigerant portion by heat exchange with said cold residual gas stream, whereby said residual gas stream is warmed to form a product residual gas stream having a reduced content of said gaseous component, combining the cooled first and second refrigerant portions to form a cooled refrigerant stream, adiabatically expanding said cooled refrigerant stream to reduced pressure to form a vaporized refrigerant phase and a residual liquid refrigerant phase at a further reduced temperature, pressurizing said residual liquid refrigerant phase, whereby said liquid phase is sub-cooled, recycling the sub-cooled residual liquid refrigerant phase as said sub-cooled pressurized liquid refrigerant stream, compressing said vaporized refrigerant phase in mechanical compression means, cooling said compressed refrigerant vapor phase to form condensed liquid refrigerant, adiabatically expanding said condensed liquid refrigerant to reduced pressure to form additional vaporized refrigerant phase and additional residual liquid refrigerant phase and compressing and cooling said additional vaporized refrigerant phase to form further condensed liquid refrigerant.

2. The method of claim 1, in which said mixed gas stream is a hydrogen-containing synthesis gas stream at elevated pressure and free of water vapor, said condensable gaseous component is carbon dioxide, and said synthesis gas stream is cooled to a temperature below −10° C. by said heat exchange.

3. A method for the removal of carbon dioxide by condensation from a hydrogen-containing synthesis gas stream at elevated pressure which comprises cooling said synthesis gas stream at elevated pressure by heat exchange with a high pressure byproduct stream comprising carbon dioxide, whereby said synthesis gas stream is cooled, water vapor is condensed from said synthesis gas stream as first liquid water condensate, and said byproduct carbon dioxide stream is superheated, expanding said superheated byproduct carbon dioxide stream to a reduced pressure through power producing means, discharging said byproduct carbon dioxide stream at low pressure, separating said first liquid water condensate from said synthesis gas stream, further cooling said synthesis gas stream by heat exchange with a first sub-cooled pressurized liquid refrigerant stream, whereby further water vapor is condensed from said synthesis gas stream as second liquid water condensate, separating said second liquid water condensate from said synthesis gas stream, removing residual water vapor from said synthesis gas stream, further cooling said synthesis gas stream to a temperature below −10° C. by heat exchange with a second sub-cooled pressurized liquid refrigerant stream, whereby a major portion of the carbon dioxide content of said synthesis gas stream is condensed to liquid carbon dioxide, further utilizing the resulting warmed second liquid refrigerant stream as said first liquid refrigerant stream, separating said liquid carbon dioxide from the cold residual synthesis gas stream, dividing the warmed first liquid refrigerant stream derived from said heat exchange with synthesis gas stream into a first refrigerant portion and a second refrigerant portion, cooling said first refrigerant portion by heat exchange with said liquid carbon dioxide, whereby said liquid carbon dioxide is warmed to form said high pressure byproduct stream comprising carbon dioxide, cooling said second refrigerant portion by heat exchange with said cold residual synthesis gas stream, whereby said residual synthesis gas stream is warmed to form product synthesis gas of reduced carbon dioxide content, combining the cooled first and second refrigerant portions to form a cooled refrigerant stream, adiabatically expanding said cooled refrigerant stream to reduced pressure to form a vaporized refrigerant phase and a residual liquid refrigerant phase at a further reduced temperature, pressurizing said residual liquid refrigerant phase, whereby said liquid phase is sub-cooled, recycling the sub-cooled residual liquid refrigerant phase as said second liquid refrigerant stream, compressing said vaporized refrigerant phase in mechanical compression means, cooling said compressed refrigerant vapor phase to form condensed liquid refrigerant, adiabatically expanding said condensed liquid refrigerant to reduced pressure to form additional vaporized refrigerant phase and additional residual liquid refrigerant phase, and compressing and cooling said additional vaporized refrigerant phase to form further condensed liquid refrigerant.

4. The method of claim 3, in which said synthesis gas stream is cooled by said heat exchange with second liquid refrigerant stream to a temperature in the range of −25° C. to −40° C.

5. The method of claim 3, in which said power producing means is connected with and thereby serves to provide power for said mechanical compression means.

6. The method of claim 3, in which said synthesis gas stream is cooled at elevated pressure in said heat exchange with byproduct gas stream by dividing said synthesis gas stream into a plurality of portions, passing each of said gas stream portions through an individual heat exchange means, combining the resulting cooled synthesis gas stream portions, passing said byproduct stream comprising carbon dioxide through all of said individual heat exchange means in series, whereby said byproduct carbon dioxide stream is superheated in each individual heat exchange means, and expanding said superheated byproduct stream to successively reduced pressure levels through a plurality of individual power producing means, each of said power producing means serving to expand said byproduct stream after said byproduct stream passes through one of said individual heat exchange means.

7. The method of claim 3, in which said liquid refrigerant is selected from the group consisting of Freon, ammonia, propane and butane.

8. The method of claim 3, in which the warmed second liquid refrigerant stream derived from said heat exchange with the synthesis gas stream is divided into a first portion and a second portion, the first portion of warmed second liquid refrigerant stream is utilized and further warmed as said first liquid refrigerant stream, and the second portion of warmed second liquid refrigerant stream is recycled and adiabatically expanded to reduced pressure together with said condensed liquid refrigerant.

9. The method of claim 8, in which said second portion of warmed second liquid refrigerant stream together with said condensed liquid refrigerant are adiabatically expanded to reduced pressure in a plurality of stages at successively reduced pressure levels, a refrigerant vapor portion is withdrawn at each pressure level and compressed and recycled, and the residual liquid refrigerant phase is adiabatically expanded into the lowest pressure stage together with said cooled refrigerant stream derived from said heat exchanges with liquid carbon dioxide and cold residual synthesis gas stream.

10. A method for the removal of carbon dioxide by condensation from a hydrogen-containing synthesis gas stream at elevated pressure which comprises dividing said synthesis gas stream into a plurality of portions, cooling said synthesis gas stream portions by heat exchange with a high pressure byproduct stream comprising carbon dioxide, by passing each of said gas stream portions through an individual heat exchange means and passing said byproduct carbon dioxide stream through all of said individual heat exchange means in series, whereby said byproduct carbon dioxide stream is superheated in each individual heat exchange means, expanding said superheated byproduct carbon dioxide stream to successively reduced pressure levels through a plurality of individual power producing means, each of said power producing means serving to expand said byproduct stream after said byproduct stream passes through one of said individual heat exchange means, combining the resulting cooled synthesis gas stream portions to form a cooled synthesis gas stream containing a first portion of condensed liquid water, separating said first liquid water condensate from said synthesis gas stream, further cooling said synthesis gas stream by heat exchange with a first sub-cooled pressurized liquid refrigerant stream, whereby further water vapor is condensed from said synthesis gas stream as second liquid water condensate, separating said second liquid water condensate from said synthesis gas stream, removing residual water vapor from said synthesis gas stream, further cooling said synthesis gas stream to a temperature below −10° C. by heat exchange with a second sub-cooled pressurized liquid refrigerant stream, whereby a major portion of the carbon dioxide content of said synthesis gas stream is condensed to liquid carbon dioxide, dividing the resulting warmed second liquid refrigerant stream into a first portion and a second portion, further utilizing and warming said first portion of said warmed second liquid refrigerant stream as said first liquid refrigerant stream, separating said liquid carbon dioxide from the cold residual synthesis gas stream, dividing the warmed first liquid refrigerant stream derived from said heat exchange with synthesis gas stream into a first refrigerant portion and a second refrigerant portion, cooling said first refrigerant portion by heat exchange with said liquid carbon dioxide, whereby said liquid carbon dioxide is warmed to form said high pressure byproduct stream comprising carbon dioxide, cooling said second refrigerant portion by heat exchange with said cold residual synthesis gas stream, whereby said residual synthesis gas stream is warmed to form product synthesis gas of reduced carbon dioxide content, combining the cooled first and second refrigerant portions to form a cooled refrigerant stream, adiabatically expanding said cooled refrigerant stream to reduced pressure to form a vaporized refrigerant phase and a sub-cooled residual liquid refrigerant phase at a further reduced temperature, pressurizing said residual liquid refrigerant phase, whereby said liquid phase is sub-cooled, recycling the sub-cooled residual liquid refrigerant phase as said second sub-cooled liquid refrigerant stream, compressing said vaporized refrigerant phase in mechanical compression means, cooling said compressed refrigerant vapor phase to form condensed liquid refrigerant, adiabatically expanding said condensed liquid refrigerant together with said second portion of said warmed second liquid refrigerant stream to reduced pressure in a plurality of stages at successively reduced pressure levels, withdrawing and compressing a refrigerant vapor portion at each pressure level together with said vaporized refrigerant phase, and adiabatically expanding the residual liquid refrigerant portion into the lowest pressure stage together with said cooled refrigerant stream derived from said heat exchanges with liquid carbon dioxide and cold residual synthesis gas stream.

11. The method of claim 10, in which at least one of said individual power producing means is connected with and thereby serves to provide power for said mechanical compression means.

12. The method of claim 10, in which said synthesis gas stream is cooled by said heat exchange with second liquid refrigerant stream to a temperature in the range of −25° C. to −40° C.

13. The method of claim 10, in which said liquid refrigerant is selected from the group consisting of Freon, ammonia, propane and butane.

References Cited

UNITED STATES PATENTS

| 2,632,316 | 3/1953 | Eastman | 62—40 X |
| 2,960,837 | 11/1960 | Swenson et al. | 62—40 X |
| 3,092,976 | 6/1963 | Tafreshi | 62—40 X |
| 3,181,307 | 5/1965 | Kuerston | 62—40 X |

NORMAN YUDKOFF, *Primary Examiner.*

V. W. PRETKA, *Assistant Examiner.*